Figure 1:
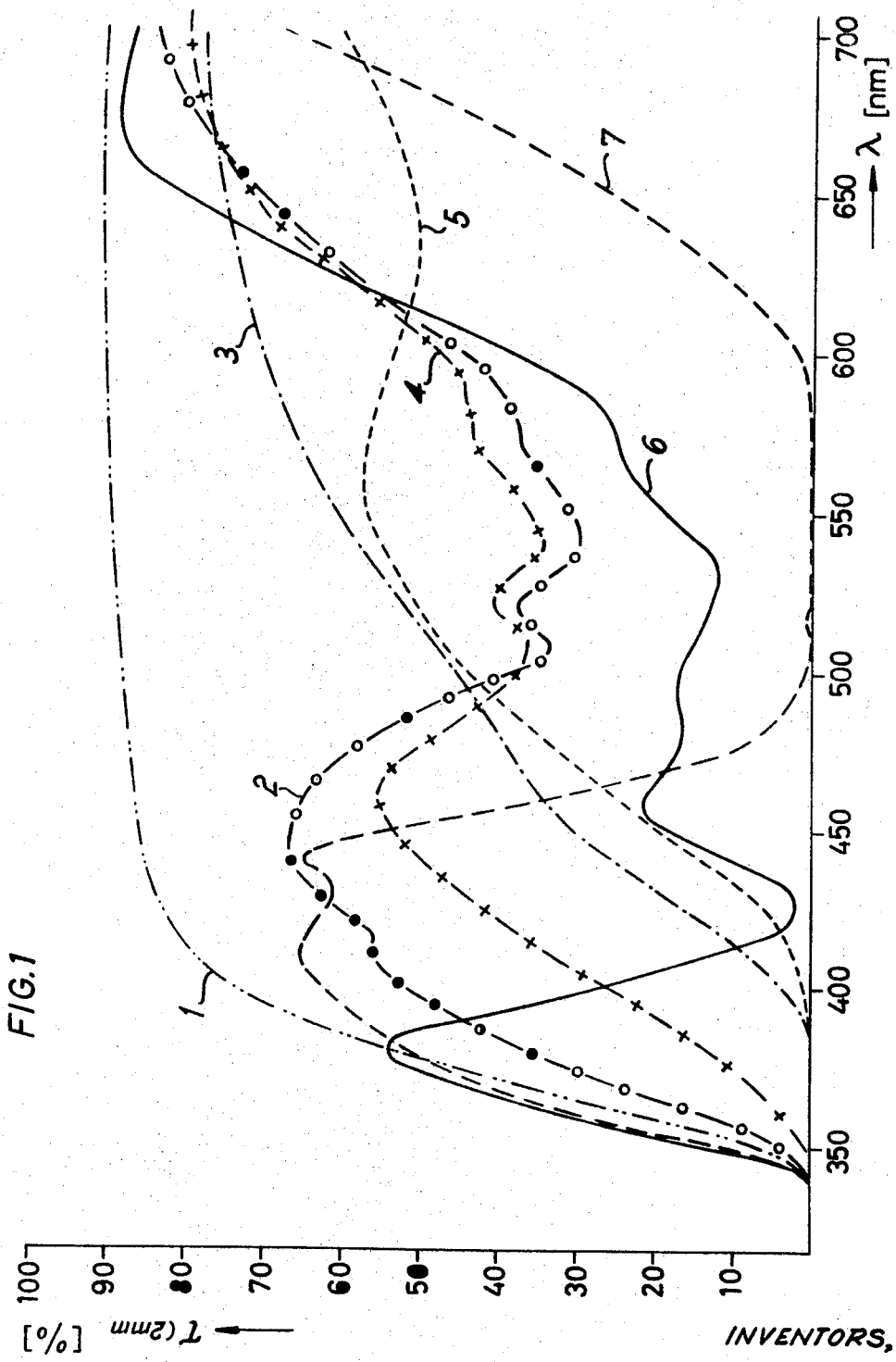

United States Patent

[11] 3,617,317

[72] Inventors: Werner Sack, Mainz-Gonsenheim; Herwig Scheidler, Mainz-Mombach, both of Germany
[21] Appl. No. 740,317
[22] Filed: June 26, 1968
[45] Patented: Nov. 2, 1971
[73] Assignee: Jenaer Glaswerk Schott & Gen. Mainz, Germany
[32] Priority: June 29, 1967
[33] Germany
[31] P 15 96 858.8

[54] GLASS BATCHES FOR THE PRODUCTION OF TRANSPARENT GLASS CERAMICS CONTAINING SOLID SOLUTIONS OF β-EUCRYPTITE
5 Claims, 2 Drawing Figs.

[52] U.S. Cl. ............................................. 106/52, 106/39 DV, 65/33
[51] Int. Cl. ............................................. C03c 3/22
[50] Field of Search ............................ 106/39 DV, 52; 65/33

[56] References Cited
UNITED STATES PATENTS

| | | | |
|---|---|---|---|
| 3,157,522 | 11/1964 | Stookey | 106/39 |
| 3,241,985 | 3/1966 | Kuwayama | 106/39 |
| 3,252,811 | 5/1966 | Beall | 106/39 |
| 3,282,712 | 11/1966 | Tashiro et al. | 106/39 |
| 3,380,818 | 4/1968 | Smith | 106/39 |

*Primary Examiner*—Helen M. McCarthy
*Attorney*—Burgess, Dinklage & Sprung

ABSTRACT: Glass having the following composition:

| | |
|---|---|
| $SiO_2$ | 67.7–69.6 |
| $Al_2O_3$ | 18.7–19.2 |
| $Li_2O$ | 2.8–2.9 |
| $Na_2O$ | 0.7 |
| CaO | 0.8–2.2 |
| MgO | 0.0–2.5 |
| ZnO | 0.0–5.2 |
| $TiO_2$ | 1.5 |
| $ZrO_2$ | 1.8 |
| $Sb_2O_3$ | 1.0 | the sum of CaO+MgO+ZnO being 3.3–5.8 percent by weight and the weight ratio of MgO+ZnO/CaO being between 1.4 and 6.6. Heattreating of objects formed of such glass at about 650° to 850° C. whereby to form transparent glass ceramics containing solid solutions of β-eucryptite having a coefficient of thermal expansion of about −7 to +14 ×10$^{17}$/°C. within the temperature range of about 20° to 300° C.

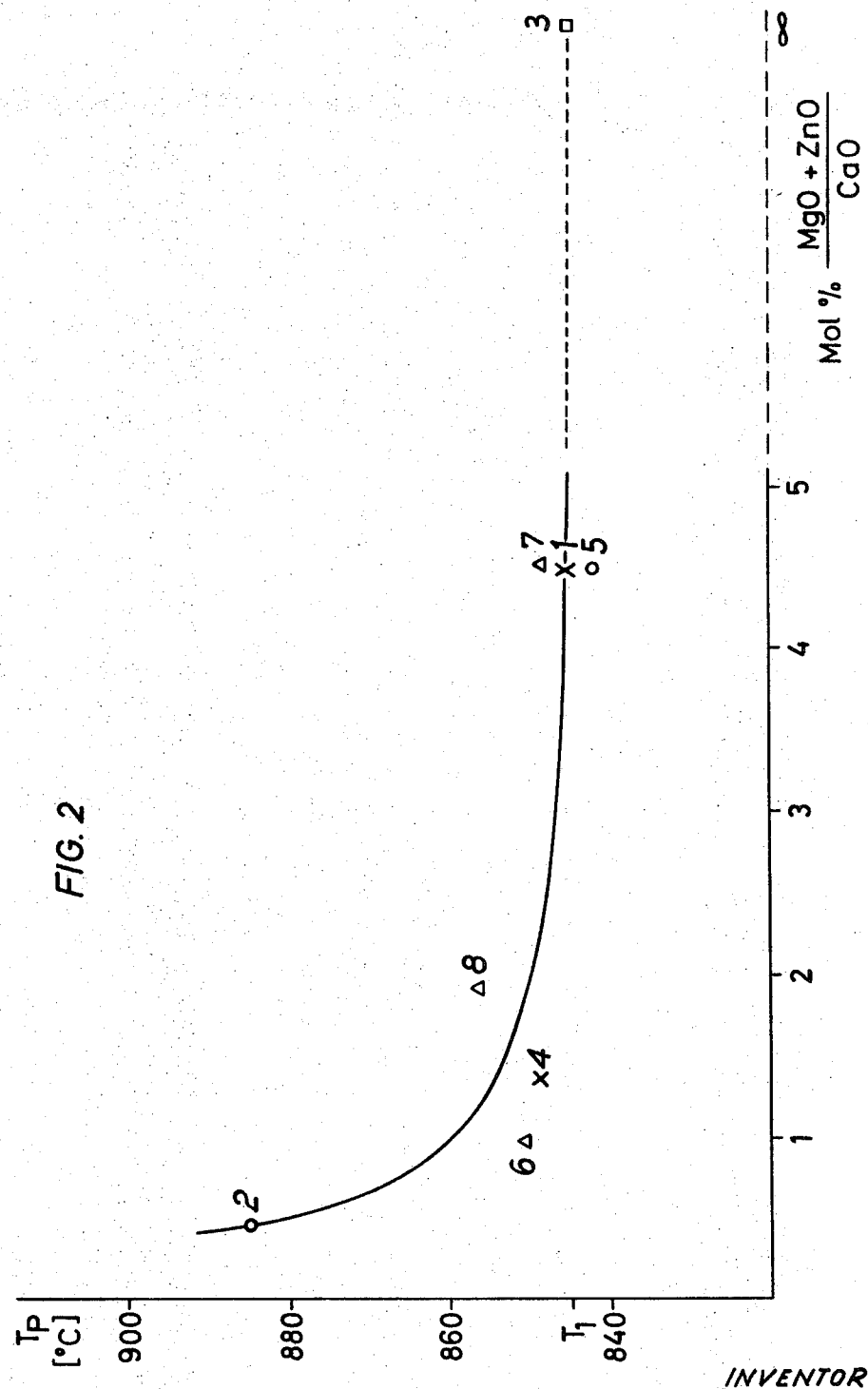

GLASS BATCHES FOR THE PRODUCTION OF TRANSPARENT GLASS CERAMICS CONTAINING SOLID SOLUTIONS OF β-EUCRYPTITE

This invention relates to glass ceramics containing solid solutions of β-eucryptite. It more particularly refers to a novel method of making such glass ceramics.

Glass ceramics have been known for a long time. It is only during the last 10 years, however, that they have achieved industrial manufacture and wider use. There is already an extensive literature on this new material. In the articles by W. SACK, Glass, Glass Ceramic and Sintered Glass Ceramic, Chem. Ing. Techn. Vol. 37 (1965), No. 11, pages 1,154–1,165, and by W. SACK and H. SCHEIDLER, Influence of the Nucleation Agents $TiO_2$ and $ZrO_2$ on the Separating Crystal Phases upon the Formation of Glass Ceramics, Glastechn. Ber. 39, (1966), No. 3, pages 126–130, the technical literature, including the patent literature is discussed. The essence and the characteristic features of glass ceramics are discussed in detail in said articles.

The $SiO_2$-$Al_2O_3$-$Li_2O$ phase diagram gives quantitative information for the formation of β-eucryptite $Li_2O:Al_2O_3:SiO_2=1:1:2$)-and β-spodumene ($Li_2O:Al_2O_3:SiO_2=1:1:4$)-containing glass ceramics with regard to the stability ranges of the crystal phases which separate out. This phase diagram is described in the book PHASE DIAGRAMS FOR CERAMISTS, published in 1956 by the American Ceramic Society by Levin, McMurdie and Hall in FIG. 191 on page 86. Of the glass ceramic literature, the basic works of Hummel et al. of Smoke, German Pat. Nos. 570,148; 637,916 (Singer), and 1,007,231 (Albrecht, Eppler and Maucher), as well as the article "New Hard Materials of Glass" in the brochure "Examples of Applied Research" published by the Fraunhofer Society for the Promotion of Applied Research in 1955, are of particular importance for the development of β-spodumene-containing glass ceramics.

The quantitative data for the main components $SiO_2$, $Al_2O_3$ and $Li_2O$, given in the first German patents to be published, 1,045,056; 1,159,142 and German Provisional Pat. No. 1,090,397, for the formation of predominantly β-spodumene-containing opaque glass ceramics can be derived from the above-referred diagram and the said publications. In addition, the starting glasses suitable for transformation from the vitreous state into the crystalline state contain small quantities of bivalent metal oxides such as MgO and XnO as well as $TiO_2$ as nucleation agent. The transformation of these initial glasses into the crystalline glass-ceramics state is effected by a heat treatment above the transformation temperature $\eta \sim 10^{13.5}$ poise) of about 700°–1,100° C. As compared with the known and used glasses, these glass-ceramic base glasses have much higher nucleation and crystallization rates. They are at least a factor of 10 higher than the corresponding values of the utility glasses.

It is therefore understandable that such glasses which tend particularly easily to devitrify can be converted by heat treatment into crystalline glass-ceramic bodies. For a long time it has been thought to be a characteristic feature of all glasses that they can be transformed from the metastable vitreous state more or less completely into the stable crystalline state by a heat treatment above the transformation temperature. Such a transformation does not take place below the transformation temperature since at these temperatures the viscosity of the glass is too great to permit any noticeable crystal growth.

Therefore, the following prerequisites must be satisfied for the formation of glass ceramics:

a. suitable composition of the initial glasses,
b. addition of nucleation agents,
c. well-defined heat treatment In the production of β-spodumene-containing glass ceramics, respectively glass ceramics containing solid solutions of β-eucryptite is first formed between about 700° and 900° C.; it being converted upon further increase in the temperature up to about 1,100° C. into β-spodumene. Such β-spodumene bodies are opaque and in general have a white porcelainlike appearance. The β-spodumene-containing crystalline masses melt between 1,280° and 1,300° C. In the temperature range of the formation of β-eucryptite a more or less broad transparent, but still crystalline region occurs when the crystallites formed are smaller than the wavelengths of visible light. (<0.1 μ) and there is no substantial difference in the index of refraction from the surrounding matrix of the residual glass phase.

The development of such transparent β-eucryptite-containing glass ceramics has recently been of wide interest. In addition to their transparency, such bodies are characterized by very small, and even negative, coefficients of thermal expansion, to mention merely one property which is very important for use. Thus they have a high resistance to temperature alternations which is not achieved by any of the conventionally known glasses aside from quartz glass.

The industrial production of such transparent glass-ceramic products, i.e., the production, for instance, by automatic pressing and blowing machines and the subsequent transformation from the vitreous state into the crystalline state, has however, inherent in it a number of serious problems which make such manufacture very difficult or entirely impossible. Frequently therefore the only way to manufacture such glasses involves expensive manual manufacture and a very expensive heat-treating process to convert to ceramic. These difficulties are caused by the great tendency of the initial glasses to devitrify in contradistinction to the technical apparatus and instrument glasses, where such a problem is practically unknown. Although the maxima of the nucleation and the crystallization are in the temperature range corresponding to high viscosities (about $10^{13.5}$–$10^6$ poise), nevertheless, a partial devitrification can also take place at lower working viscosities which must be maintained relatively closely. The reason for this is the high melting, and thus dissolving, temperature of β-spodumene of 1,280°–1,300° C. or the temperature difference between the latter and the corresponding working temperature. Crystals forming in the molten state make automatic working impossible. Such a partial crystallization can always occur upon dropping the glass to below the temperature of 1,280°/1,300° C. Particularly dangerous places for this are the edge zones of the orifice ring of the feeder. It is therefore understandable that attempts have everywhere been made to control these difficulties by intensive research work.

It is therefore an object of this invention to provide a novel method of making transparent glass ceramics containing solid solutions of β-eucryptite.

It is another object of this invention to provide a novel glass batch.

It is a further object of this invention to provide such novel glass ceramics having very low coefficients of thermal expansion.

Other and additional objects of this invention will become apparent from a consideration of this entire specification including the claims and the drawing thereof.

Understanding of this invention will be facilitated by reference to the accompanying drawings, in which:

FIG. 1 shows a family of curves graphically depicting variations of transmission in various colored glass; and FIG. 2 shows a graphical representation of the relationship of the calculated peak temperature as a function of the MgO+ZnO/CaO mole ratio for glass of this invention.

In accordance with and fulfilling these objects, one aspect of this invention resides in a glass batch having the following composition in weight percent:

| | |
|---|---|
| $SiO_2$ | 67.7–69.6 |
| $Al_2O_3$ | 18.7–19.2 |
| $Li_2O$ | 2.8–2.9 |
| $Na_2O$ | 0.7 |
| CaO | 0.8–2.2 |
| MgO | 0.0–2.5 |
| ZnO | 0.0–5.0 |
| $TiO_2$ | 1.5 |
| $ZrO_2$ | 1.8 |
| $Sb_2O_3$ | 1.0 | and the sum of CaO+MgO+ZnO being 3.3-5.8 percent by weight and the weight ratio of MgO+ZnO/CaO being between 1.4 and 6.6.

The range of composition of the glass batches comprises, converted into mol-percent:

| | |
|---|---|
| $SiO_2$ | 73.84 |
| $Al_2O_3$ | 12.00 |
| $Li_2O$ | 6.13 |
| $Na_2O$ | 0.73 |
| CaO | 0.89-2.50 |
| MgO | 0.00-4.02 |
| ZnO | 0.00-4.02 |
| $TiO_2$ | 1.22 |
| $ZrO_2$ | 0.95 |
| $Sb_2O_3$ | 0.22 | the sum of CaO+MgO+ZnO being always 4.91 mol-percent and the mol ratio of MgO+ZnO/CaO being between 0.96 and 4.51.

the glass batches in accordance with the invention afford the possibility of producing thin-walled blown and pressed articles as well as thick-walled optical castings. In this connection, optimum conditions are obtained with respect to the workability of the melt and also with respect to the crystallization of the articles. The difficulties described above in connection with the production of transparent glass ceramics are substantially eliminated by using these glass batches.

Another aspect of this invention resides in a method of forming shaped articles from the above-described glass batches and converting such articles into transparent glass ceramics containing solid solutions of β-eucryptite by forming shaped articles from a melt of such glass batches and then heat treating such shaped articles at about 650° to 850° C. to produce a glass ceramic product having a coefficient of thermal expansion of about −7 to +14×10$^{17}$/° C. within the temperature range of about 20° to 300° C. It is important to note that the base glass system herein is $SiO_2$-$Al_2O_3$-$Li_2O$ plus $TiO_2$ and $ZrO_2$ as nucleation agent and additionally MgO, ZnO and CaO.

The transparent glass ceramics produced in the range of composition set forth above have a slightly yellow to yellowish brown tinge, caused predominantly by the $TiO_2$ content. Without impairing the melt behavior, the crystal phase and the physical values of the finished articles, it is possible by addition introduction of small amounts of colored oxides, such as $MnO_2$, CuO, $Cr_2O_3$, CoO, NiO and $Fe_2O_3$, to obtain colored transparent glass ceramics. The following colors are obtained using the indicated proportions of oxide additives:

0.40 weight percent CoO: dark blue
1.0 weight percent $MnO_2$+0.07 weight percent CoO: violet
0.55 weight percent CuO+0.06 weight percent CoO: pink
0.10 weight percent $Cr_2O_3$: green
0.46 weight percent NiO: ruby red
0.25 weight percent $Fe_2O_3$: yellow-brown The variations of the transmission $\tau$ of these colored glass ceramics for a layer thickness of 2 mm. is shown in FIG. 1, curves 1 to 7, referring to the following compositions or color additions:

| | |
|---|---|
| glasses of the composition set forth above (unmodified) | curve 1 |
| dark blue | curve 7 |
| violet | curve 2 |
| pink | curve 4 |
| green | curve 5 |
| ruby red | curve 6 |
| yellow-brown | curve 3 |

Tables 1 and 2, below, contain by way of further explanation of the invention, the percentage by weight compositions of seven glass-ceramic base glasses and a number of characteristic physical values. All glasses, in mol-percent, have the same composition except for the added bivalent metal oxides. For a constant total of Cao+MgO+ZnO, the ratio of MgO+Zno/CaO varies. The influence of the proportions of these components in their different combination on the properties of the melt, and on the corresponding base glasses and the glass ceramics produced therefrom, is very evident. It is therefore possible to note the advance in the art represented by the compositions of the invention over the prior art. All compositions in accordance with the invention can be melted down in very good quality at 1,600°/1,620° C.; from a working standpoint, they are still relatively long glasses with working points ($V_A$: $\eta=10^4$ poise) between 1,332° and 1,353° C. They are thus excellently suitable for completely automatic production by blowing and pressing.

Many of the transparent glass ceramic starting glasses known up to the present time, on the other hand, have $V_A$ values which lie above this range and extend up to 1,400° C. Such glasses are unsuitable for automatic working (for instance U.S. Pat. No. 3,241,985). Other compositions require very high melting temperature to a maximum of 1,800° C. as in U.S. Pat. No. 3,252,811, due to the poor solubility of the $ZrO_2$ and the high $ZrO_2$ content of 4-10 percent by weight introduced. It has been shown by experience, substantially longer times for good homogeneous melts to form. In addition to this, there is also the more unfavorable ceramicizing behavior of the glasses containing only $ZrO_2$. Melting temperatures of more than 1,650° C. can at present not be obtained for large industrial melting units, so that economical mass production of such glass ceramics is not possible.

TABLE I

Compositions in wt. % of the Glass Ceramic Base Glasses 1-7

| Component | 1 | 2 | 3 | 4 | 5 | 6 | 7 |
|---|---|---|---|---|---|---|---|
| $SiO_2$ | 68.5 | 69.1 | 68.8 | 69.6 | 68.2 | 67.7 | 68.0 |
| $Al_2O_3$ | 18.9 | 19.1 | 19.0 | 19.2 | 18.8 | 18.7 | 18.7 |
| $Li_2O$ | 2.8 | 2.9 | 2.9 | 2.9 | 2.8 | 2.8 | 2.8 |
| $Na_2O$ | 0.7 | 0.7 | 0.7 | 0.7 | 0.7 | 0.7 | 0.7 |
| CaO | 0.8 | 2.9 | 1.8 | 0.8 | 2.2 | 0.8 | 1.5 |
| MgO | 1.0 | 1.0 | 1.0 | 2.5 | | | |
| ZnO | 3.0 | 1.5 | | | 3.0 | 5.0 | 4.0 |
| $TiO_2$ | 1.5 | 1.5 | 1.5 | 1.5 | 1.5 | 1.5 | 1.5 |
| $ZrO_2$ | 1.8 | 1.8 | 1.8 | 1.8 | 1.8 | 1.8 | 1.8 |
| $Sb_2O_3$ | 1.0 | 1.0 | 1.0 | 1.0 | 1.0 | 1.0 | 1.0 |
| Sum | 100.0 | 100.0 | 100.0 | 100.0 | 100.0 | 100.0 | 100.0 |

The following raw materials are used to produce a melt of 100 kg. of glass of composition No. 1.

67.80 kg. of sand ($SiO_2$), 28.60 kg. of hydrated alumina ($Al_2O_3$), 2.70 kg. of zirconium silicate ($ZrO_2$), 1.50 kg. of titanium oxide ($TiO_2$), 7.00 kg. of lithium carbonate ($Li_2$), 1.90 kg. of sodium nitrate ($Na_2O$), 1.45 kg. of lime (CaO), 2.40 kg. of magnesium carbonate (MgO), 3.00 kg. of zinc oxide (ZnO), 1 kg. of antimony oxide ($Sb_2O_3$).

The glass articles shaped from the melt are subjected for conversion into crystalline state to the following temperature treatment:

a. heating from room temperature to 740°±20° C. at a rate of 2°-6° C./min.
b. holding for 0.5-3 hours at 740°±20° C.
c. further increase in temperature to 840°±20° C. at a rate of 2°-6° C./min.
d. holding for 2-8 hours at 840°±20° C.
e. cooling to room temperature at a rate of <4° C./min.

The following raw materials were used to produce a melt of 100 kg. of glass of composition No. 4: 68.90 kg. of sand ($SiO_2$), 29 kg. of hydrated alumina ($Al_2O_3$), 2.70 kg. of zirconium silicate $ZrO_2$), 1.50 kg. of titanium oxide ($TiO_2$), 7.20 kg. of lithium carbonate ($Li_2O$), 1.90 kg. of sodium nitrate ($Na_2O$), 1.45 kg. of lime (CaO), 6.10 kg. of magnesium carbonate MgO), 1.00 kg. of antimony oxide ($Sb_2O_3$).

The transformation of the articles produced from this melt from the vitreous state into the crystalline state is effected in accordance with the same temperature program as for composition no. 1

The following raw materials are used to produce a melt of 100 kg. of glass of composition no. 7: 67.30 kg. of sand ($SiO_2$), 28.30 kg. of hydrated alumina ($Al_2O_3$), 2.70 kg. of zirconium silicate ($ZrSiO_4$), 1.50 kg. of titanium oxide ($TiO_2$), 7.00 kg. of lithium carbonate ($Li_2O$), 1.90 kg. of sodium nitrate ($Na_2O$), 2.70 kg. of lime (CaO), 4.00 kg. of zinc oxide (ZnO), 1.00 kg. of antimony oxide ($Sb_2O_3$).

the transformation of the objects produced in this melt from vitreous state into crystalline state is effected in accordance with the same temperature program as for composition no. 1.

pearance make possible definite predictions as to the effect of these three components:

The following picture results:

ZnO and MgO are readily incorporated in the solid solution of the β-eucryptite crystal phase which is formed (deep DTA peaks = high crystallization speed). However, ZnO changes the known expansion anisotropy of β-eucryptite only slightly since it is reduced by MgO. The practical effect of this is that the former compositions lead to glass ceramics having sightly negative coefficients of thermal expansion (for instance glass 6), while with an increasing incorporation of MgO increasingly more positive values (for instance glass 4) are obtained.

TABLE II.—PROPERTIES OF THE BASE GLASSES OF TABLE I IN VITREOUS AND CRYSTALLINE STATES

| Properties | 1 | 2 | 3 | 4 | 5 | 6 | 7 |
|---|---|---|---|---|---|---|---|
| (a) In vitreous state | | | | | | | |
| Coefficient of linear thermal expansion, $\alpha \times 10^7$ (20–300° C)/° C | 37.4 | 42.4 | 40.1 | 39.9 | 40.2 | 27.4 | 38.4 |
| Transformation point Tg in ° C. ($\eta \sim 10^{13.5}$ poise) | 665 | 700 | 676 | 689 | 668 | 656 | 655 |
| Density, D in g./ccm | 2.48 | 2.44 | 2.46 | 2.44 | 2.47 | 2.49 | 2.48 |
| Index of refraction $n_D$ | 1.5246 | 1.5236 | 1.5238 | 1.5223 | 1.5256 | 1.5250 | 1.5245 |
| Working point $V_a$ in ° C. ($\eta = 10^4$ poise) | 1336 | 1332 | 1333 | 1353 | 1341 | 1342 | 1336 |
| Length ($V_a$–Tg) $\Delta T$ in ° C | 671 | 632 | 657 | 664 | 673 | 686 | 681 |
| Position of the DTA peak in ° C | 845 | 920 | 860 | 865 | 855 | 840 | 847 |
| (b) In crystalline state.—2 hrs. nucleation between 650–760° C. and 3 hrs. crystallization between 830–850° C | | | | | | | |
| Coefficient of linear thermal expansion $\alpha \times 10^7$ (20–300° C.)/° C | 2.0 | 12.3 | 8.0 | 14.0 | −1.4 | −7 | −5 |
| Density, D in g./ccm | 2.56 | 2.51 | 2.54 | 2.53 | 2.55 | 2.57 | 2.57 |
| Difference in density vitreous/crystalline in percent vitreous | 3.23 | 2.87 | 3.25 | 3.68 | 3.24 | 3.22 | 3.63 |
| Index of refraction, $n_D$ | 1.5430 | 1.5380 | 1.5420 | 1.5420 | 1.5413 | 1.5428 | 1.5425 |
| Relative crystal phase content in percent referred to glass 1=100% | 100 | 77 | 90 | 95 | 85 | 101 | 92 |
| Absolute crystal phase content in percent | 75 | 58 | 68 | 71 | 64 | 76 | 69 |
| Particle size of the crystallites in A. (angstrom) | 650 | 600 | 450 | 600 | 400 | 500 | 450 |
| Crystal phase.—Solid solutions of β-eucryptite | | | | | | | |
| Appearance | (1) | (2) | | Transparent | | | |

[1] Transparent.
[2] Slightly clouded.

The optimum temperatures and times for nucleation and crystallization were experimentally determined. As criteria for this, there were evaluated the changes in the densities, indices of refraction and coefficients of thermal expansion, as well as the transparency after the crystallization. The values of these properties set forth in table II in combination with the compositions shown in table I indicate very clearly the importance of the bivalent metal oxides CaO, MgO and ZnO for the production of transparent glass ceramics containing solid solutions of β-eucryptite. It should be noted that the sum of CaO+MgO+ZnO of 3.3 to 5.8 percent by weight corresponds to a constant sum of 4.91 mol-percent, and glasses 1–7 were obtained by mol-percent exchange of these three components. THe length of the glasses ($V_A$-Tg) lies between 632° C. (glass 2) and 686° C. (glass 6). They are thus more similar in workability to the borosilicate glasses of type D50 Pyrex ($V_a$-Tg 730° C.) —although their viscosities are displaced towards higher temperatures—than the higher shifting and very short aluminosilicate glasses (VA–Tg ~490° C.) which are not suitable for automatic working. The shortest glasses are those which are rich in CaO at the expense of ZnO. The longest glasses are those which are rich in ZnO at the expense of CaO. The replacing of ZnO by MgO has less pronounced effect in the same direction.

A particularly valuable aid for the examination of devitrification processes is differential thermoanalysis. By means of it, the temperature position of endothermally and exothermally proceeding reactions can be very accurately determined. This applies in the present case also to the transformation of vitreous into crystalline state which is characterized by a pronounced exothermal peak. The position of these peaks (rate of heating 5° C. min.) as a function of the ratio of MgO+ZnO/CaO and in combination with the property values of the base glasses or the glass ceramics produced therefrom such as $\alpha$, Tg, changes in density, changes in index of refraction, crystal phase, crystal-phase content, particle size and appearance make possible definite predictions as to the effect of CaO is not incorporated into the β-eucryptite lattice. It not only shifts the transformation from the vitreous state into the crystalline state towards higher temperatures (high DTA peak), but at the same time reduces the rate of crystallization and the crystal-phase content, whereby the coefficient of thermal expansion increases (for instance glass 2) somewhat more weakly than in the case of the comparable MgO-containing glasses. CaO-containing base glasses, having more than 3 percent by weight of CaO require long periods of time for ceramicizing and are cloudy. Despite this different effect of the ZnO, MgO and CaO, the crystalline size of all ceramicized glasses 1–7 is approximately the same at 400–650 A.

Merely by suitably combining these three components within the limits indicated, and by keeping the proportions of the other components constant, transparent glass ceramics with α-values between 14 and −7×$10^{17}$/° C. can be prepared with the same crystal phase and approximately the same crystallite size.

The DTA peaks of glasses 1–7 lie between 840° C. and 920° C.

The displacement of the peaks and thus the displacement of the maximum crystallization temperature is of great importance for the production of transparent glass ceramics, since in this way the tendency of the glass articles to deform during the crystallization process can be influenced. It is preferred to use a glass composition with high rate of crystallization (low DTA peak)., for thin-walled blown and pressed articles.

For the thick-walled optical cast blocks, the reverse is more favorable, since a lower crystallization rate is more advantageous for the cooling. Upon the cooling of an optical casting from the casting temperature to room temperature, no devitrification should occur; it takes place only subsequently by a well-defined heat treatment in order to obtain a controllable crystallization.

The influence of ZnO, MgO and CaO on the position of the DTA peak becomes particularly clear if one converts from the measured peak temperatures, with due consideration of the different transformation points (viscosity) of glasses 1-7 to viscosity-independent peak temperatures (referred to the Tg-Point of glass 1). This is best done in accordance with the equation:

$$T_p = Tx - (T_{ox} - T_{oi}) \; [°c.]$$

in which:
$T_p$ = calculated peak temperature
$Tx$ = measured peak temperature of the considered glass
$T_{oi}$ = transformation temperature ($T_o$) of glass 1
$T_{ox}$ = transformation temperature of the considered glass If the $T_P$ temperatures calculated in this manner as a function of the mol ratio of MgO+Zno/CaO, are plotted, FIG. 2 is obtained. It can be noted therefrom that with a ratio of <4, the peak temperature rise, while with a ratio of >4, the peak temperatures remain approximately constant at 840°±5° C. Glasses having a ratio of <0.5 have high peak temperatures of about 900° C. and are generally cloudy after the crystallization As already mentioned, the resistance to devitrification of the melts represents another important factor for working by hand or automatically. Insight into the devitrification behavior of the different melts is obtained if the glasses are first of all melted for 1 hour at 1500° C. to eliminate crystal nuclei and if thereupon, by tempering for 24 hours at decreasing temperatures, the limit temperature (viscosity) at which the first crystals occur, is determined. The difference between this temperature and the different working temperatures gives information as to whether the corresponding working technique can be employed. This difference is shown by experience to be at least 80°-100° C. These values are compared with each other for glasses 1-7 in table III.

same time they also change the temperature of the crystallization maximum which can again be recognized by the DTA peaks of the corresponding glasses. In the range of compositions according to the invention, the simultaneous introduction of the two nucleus formers $TiO_2$ and $ZrO_2$ is superior to each individually. A sum of 2.17 mol-percent and a mol ratio of 1.27 is sufficient for optimum nucleation effect. The color of the crystallized product is shifted more and more strongly towards the brown with an increasing $TiO_2$ addition of more than 1.5 wt.-percent Converted, this corresponds to a sum of 3.3 percent by weight or 1.5 percent by weight $TiO_2$ and 1.8 percent by weight $ZrO_2$.

The temperature of the crystallization maximum of a glass with only one nucleation agent ($TiO_2$ or $ZrO_2$) is always higher than that of a glass having two nucleation agents ($TiO_2 + ZrO_2$) and for a mol ratio of $TiO_2:ZrO_2$ of between 0.5 and 2.50 it surprisingly reaches a minimum. Upon the application of the invention, this temperature difference amounts to about 100° C. It is easily understandable that this is of very great importance for the carrying out of the crystallization process for the most different glass products.

In table IV, there is shown the influence of the nucleus formers $TiO_2$ and $ZrO_2$ on the displacement of the peak temperatures. For this purpose, a number of glasses were melted (nos. 8-14)using the composition of glass 1 in table I but with different mol ratios of $TiO_2/ZrO_2$ with a constant sum of 2.17 mol-percent. The peak temperatures of these glasses were determined.

From the discoveries of the present invention it follows that a different yardstick is to be applied to the evaluation of compositions for the production of transparent glass ceramics in the $SiO_2$-$Al_2O_3$-$Li_2O$ system that in connection with the traditional utility glasses and the composition limits for all com- TABLE III.—DEVITRIFICATION AND WORKING TEMPERATURES (° C.) WITH THE CORRESPONDING VISCOSITY VALUES (POISE) OF MELTS OF GLASSES 1-7

| | Glass | | | | | | |
|---|---|---|---|---|---|---|---|
| | 1 | 2 | 3 | 4 | 5 | 6 | 7 |
| Devitrification temperature, $T_0$ in ° C | 1,250 | 1,250 | 1,240 | 1,260 | 1,210 | 1,210 | 1,210 |
| Viscosity at $T_0$ in P | 3.8×10⁴ | 3.6×10⁴ | 3.9×10⁴ | 5×10⁴ | 7.3×10⁴ | 8×10⁴ | 7×10⁴ |
| Temperature manual work press, η∼1×10⁵ P | 1,526 | 1,520 | 1,521 | 1,529 | 1,526 | 1,530 | 1,536 |
| Temperature automatic press, η∼2.3×10³ P | 1,454 | 1,445 | 1,448 | 1,460 | 1,466 | 1,450 | 1,456 |
| Temperature automatic blowing machine, η∼4×10³ P | | | | | | | |
| Temperature Danner draw nozzle, η∼5×10³ P | 1,405 | 1,399 | 1,402 | 1,418 | 1,416 | 1,406 | 1,407 |
| Temperature plate glass, η∼1×10⁵ P | 1,388 | 1,382 | 1,385 | 1,401 | 1,397 | 1,390 | 1,389 |
| | 1,197 | 1,191 | 1,185 | 1,222 | 1,188 | 1,199 | 1,188 |
| Temperature manual work, −$T_0$ in ° C | +276 | +270 | +281 | +269 | +316 | +320 | +326 |
| Temperature automatic press, −$T_0$ in ° C | +204 | +195 | +208 | +200 | +256 | +240 | +246 |
| Temperature automatic blowing, −$T_0$ in ° C | +155 | +149 | +162 | +158 | +206 | +196 | +197 |
| Temperature Danner draw, −$T_0$ in ° C | +138 | +132 | +145 | +141 | +187 | +180 | +179 |
| Temperature plate glass draw, −$T_0$ in ° C | −53 | −59 | −55 | −38 | −22 | −11 | −22 |

It can be noted from table III that the MgO-containing melts 1-4 devitrify at higher temperatures than the MgO-free melts 5-7. The devitrification temperatures of the former lie with values of 1,240° C.-1,260° C. at 30° C.-50° C. above the corresponding values of the MgO-free melts and thus all are 40° C.-90° C. below the melting temperature of the B-spodumene crystals.

Except for the machined plate glass drawing (difference working temperature−$T_0$ negative), all melts 1-7 can be worked by the techniques indicated.

The great effects which the bivalent metal oxides ZnO, MgO and CaO cause in a range of 3.3-5.8 percent by weight, which is relatively narrow for traditional concepts of glass technology, have been hereinabove shown both in the stability of the melts and in the properties of the glasses and transparent glass ceramics produced therefrom. These findings are new and go beyond the prior art.

These effects have also found for the first time for the nucleation agents $TiO_2$ and $ZrO_2$. It was found that these components not only have the function of forming crystallization nuclei in sufficient number at the low nucleation temperatures lying in the transformation range (depending on the quantities introduced) so as to make possible upon the subsequent crystallization process a spontaneous nucleation, but at the

TABLE IV

[Influence of the nucleation agents $TiO_2$ and $ZrO_2$ on the DTA peak temperatures with constant composition of the base glass. Sum of $TiO_2 + ZrO_2 = 2.17$ mol percent corresponding to 2.71-4.11% by weight]

| | $TiO_2$ | | Weight percent | | DTA peak |
|---|---|---|---|---|---|
| | $ZrO_2$ | | | | |
| | In mol percent | In weight percent | $TiO_2$ | $ZrO_2$ | temperature (° C.) |
| Test No.: | | | | | |
| 8 | 0 | 0 | 0 | 4.11 | 960 |
| 9 | 0.38 | 0.25 | 0.74 | 2.99 | 930 |
| 10 | 0.70 | 0.46 | 1.11 | 2.43 | 850 |
| 11 | 1.27 | 0.83 | 1.50 | 1.80 | 850 |
| 12 | 2.41 | 1.56 | 1.90 | 1.22 | 855 |
| 13 | 5.41 | 3.50 | 2.28 | 0.65 | 895 |
| 14 | ∞ | ∞ | 2.71 | 0 | 932 | ponents must be considerably narrower. The yardsticks known from glass technology can therefore not be considered for glass ceramics, since here the predominant concern is with crystal-chemical processes in the material as such as this material, which is therefore susceptible to very small changes in composition, must furthermore also be brought into agreement with the most different glass-manufacturing techniques.

These explanations are not to pass for the traditional glasses. These glasses are so stable in their devitrification behavior that small changes in composition do not result in any such effects. It follows finally, however, that it is not permissible to only evaluate parts of a glass ceramic composition, i.e., the content of the main components $SiO_2$, $Al_2O_3$, $Li_2O$ or that of the bivalent metal oxides ZnO, MgO, CaO, or that of the nucleation agents $TiO_2$, $ZrO_2$. It is necessary that the interaction of all components be taken into consideration, i.e., the weight-percent composition is to be taken into consideration in its entirety for an evaluation.

We claim:

1. A glass for the production of transparent glass ceramics having the following composition in weight percent:

| | |
|---|---|
| $SiO_2$ | 67.7–69.6 |
| $Al_2O_3$ | 18.7–19.2 |
| $Li_2O$ | 2.8–2.9 |
| $Na_2O$ | 0.7 |
| CaO | 0.8–2.2 |
| MgO | 0.0–2.5 |
| ZnO | 0.0–5.0 |
| $TiO_2$ | 1.5 |
| $ZrO_2$ | 1.8 |
| $Sb_2O_3$ | 1.0 | the sum of CaO+MgO+ZnO being 3.3–5.8 percent by weight and the weight ratio of MgO+ZnO/CaO being between 1.4 and 6.6.

2. A glass as claimed in claim 1 having, in addition to the said composition, at least one coloring substance selected from the group consisting of CoO, $MnO_2$, CuO and $Cr_2O_3$.

3. A glass as claimed in claim 1 having the composition:

| | |
|---|---|
| 68.50 wt. % | $SiO_2$ |
| 18.90 wt. % | $Al_2O_3$ |
| 2.80 wt. % | $Li_2O$ |
| 0.70 wt. % | $Na_2O$ |
| 0.80 wt. % | CaO |
| 1.00 wt. % | MgO |
| 3.00 wt. % | ZnO |
| 1.50 wt. % | $TiO_2$ |
| 1.80 wt. % | $ZrO_2$ |
| 1.00 wt. % | $Sb_2O_3$ |
| 100.00 wt. % | |

4. A glass as claimed in claim 1 having the composition:

| | |
|---|---|
| 69.60 wt. % | $SiO_2$ |
| 19.20 wt. % | $Al_2O_3$ |
| 2.90 wt. % | $Li_2O$ |
| 0.70 wt. % | $Na_2O$ |
| 0.80 wt. % | CaO |
| 2.50 wt. % | MgO |
| 1.50 wt. % | $TiO_2$ |
| 1.80 wt. % | $ZrO_2$ |
| 1.00 wt. % | $Sb_2O_3$ |
| 100.00 wt. % | |

5. A glass as claimed in claim 1 having the composition:

| | |
|---|---|
| 68.00 wt. % | $SiO_2$ |
| 18.70 wt. % | $Al_2O_3$ |
| 2.80 wt-% | $Li_2O$ |
| 0.70 wt-% | $Na_2O$ |
| 1.50 wt. % | CaO |
| 4.00 wt. % | ZnO |
| 1.50 wt. % | $TiO_2$ |
| 1.80 wt. % | $ZrO_2$ |
| 1.00 wt. % | $Sb_2O_3$ |

* * * * *

FO-1050
(5/69)

UNITED STATES PATENT OFFICE
CERTIFICATE OF CORRECTION

Patent No. 3,617,317      Dated November 2, 1971

Inventor(s) Sack Werner and Herwig Scheidler

It is certified that error appears in the above-identified patent and that said Letters Patent are hereby corrected as shown below:

Abstract, second item "$Al_2O_3$" is partly nearly illegible line 13 (Spec. line 18)

"Heattreating" should be -- Heat treating --

Line 16 (Spec. line 21)

"-7 to +14 X $10^{17}/°C$" should be

-- -7 to +14 X $10^{-7}/°C$ --

Col. 2, line 6 (Spec., p.4, line 17)

"$\mu$" should be -- $\mu m$ --

Col. 3, line 20 (Spec. p. 7, line 20)

"the" should be -- The --

Col. 4, Table 1 (Spec. p. 11)

"1.5" opposite "$Z_nO$" should be under Col. 3

Col. 5, line 10 (Spec. p. 13, line 10)

"the" (first occurrence) should be -- The -- line 12 "program" not legible"

Col. 5, Table II (Spec., p. 14)

under Col. 6, "27.4" should be -- 37.4 --

Col. 5, line 52 (Spec. p. 16, line 13)

"THe" should be -- The --

Col. 6, line 56 (Spec. p. 18, line 8)

"$7 \times 10^{17}/°C$" should be $-- 7 \times 10^{-7}/°C --$

Col. 7 (Spec. p. 19,

The formula $$T_p = Tx - (T_{gx} - T \; [°C])$$

in which:
- $T_p$ = calculated peak temperature
- $Tx$ = measured peak temperature of the considered glass
- $T_g$ = transformation temperature ($T_g$) of glass 1
- $T_{gx}$ = transformation temperature of the considered glass Should read as follows:

$$T_p = Tx - \left[\frac{(T_{gx} - T_{g1})}{(T_{g1} - T_{gx})}\right] \; [°C]$$

in which:

-- $T_p$ = calculated peak temperature

-- $Tx$ = measured peak temperature of the considered glass

-- $T_{g1}$ = transformation temperature ($T_g$) of glass 1

-- $T_{gx}$ = transformation temperature of the considered glass

Signed and sealed this 2nd day of May 1972.

(SEAL)
Attest:

EDWARD M. FLETCHER, JR.
Attesting Officer

ROBERT GOTTSCHALK
Commissioner of Patents